Jan. 14, 1941. J. H. RAND, JR Re. 21,694

MULTIPLE HEAD DRY SHAVER

Original Filed July 9, 1937 4 Sheets-Sheet 1

INVENTOR.
James H. Rand, Jr.

BY Darby & Darby.
ATTORNEYS

Jan. 14, 1941. J. H. RAND, JR Re. 21,694

MULTIPLE HEAD DRY SHAVER

Original Filed July 9, 1937 4 Sheets-Sheet 2

INVENTOR.
James H. Rand, Jr.

BY Darby & Darby
ATTORNEYS

Jan. 14, 1941. J. H. RAND, JR Re. 21,694

MULTIPLE HEAD DRY SHAVER

Original Filed July 9, 1937 4 Sheets-Sheet 3

INVENTOR.
James H. Rand, Jr.
BY
Darby & Darby
ATTORNEYS

MULTIPLE HEAD DRY SHAVER

Original Filed July 9, 1937 4 Sheets-Sheet 4

INVENTOR.
James H. Rand, Jr.
BY
Darby & Darby
ATTORNEYS

Reissued Jan. 14, 1941 Re. 21,694

UNITED STATES PATENT OFFICE 21,694

MULTIPLE HEAD DRY SHAVER

James H. Rand, Jr., Stamford, Conn., assignor, by mesne assignments, to Remington Rand, Inc., New York, N. Y., a corporation of Delaware Original No. 2,164,425, dated July 4, 1939, Serial No. 152,724, July 9, 1937. Application for reissue August 2, 1940, Serial No. 349,988

17 Claims. (Cl. 30—43)

This invention relates to improvements in shaving or clipping devices of the type used without water, soap or other shaving preparations.

An object of this invention is to provide a portable hand manipulated shaving device having a plurality of spaced shaving heads operated from a common motive device.

More specifically it is an object of this invention to produce a multiple head shaving device comprising two or more independent shaving heads or assemblies all operated by a common motive device.

Another object of the invention is to provide a multiple head shaving device having the housing formed with spaced channels to receive a shaver head in each channel and position it relative to the other shaver heads, and the housing being provided with openings extending from each channel to the interior of the housing to accommodate two lever arms of a suitable motor driven lever means in the housing for engaging and reciprocating the inner cutters of the shaver heads with suitable means for detachably retaining each of the shaver heads in their respective channels.

A further object of this invention is to provide various forms of multiple head shaving devices in which the shaving devices are in a common plane, or in a plane inclined to the longitudinal axis of the housing for the operating mechanism.

A still further object of the invention is to provide a shaving device having a plurality of separate shaving heads, one or more of which may be angularly adjusted with respect to another or each other to adapt the device for more efficient engagement with the face contour.

These and many other objects as will appear from the following disclosure are secured by means of this invention.

This invention resides substantially in the combination, construction, arrangement and relative location of parts, all in accordance with the following disclosure when taken in connection with the attached drawings provided for the purpose of illustrating various forms thereof.

Figure 1:
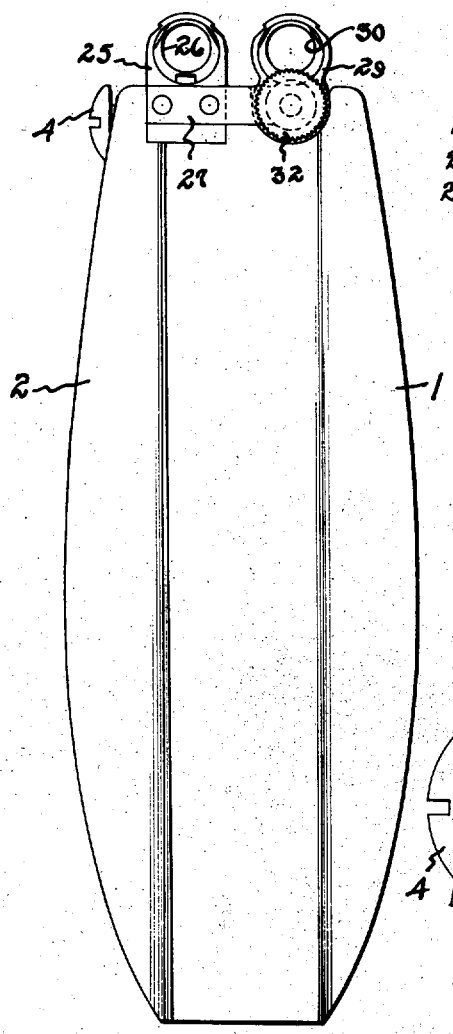
Fig. 1 is a vertical side edge elevational view of a shaver in accordance with this invention having two independent shaving heads, one of which is angularly adjustable with respect to the other.

The detailed advantages of the constructions disclosed herein will be best appreciated after a discussion of the details of the structure embodied therein. For this reason reference to the advantages will be deferred until later.

In the structure of Figs. 1 to 5 inclusive, the housing which provides the handle for holding the device and manipulating it and enclosing the operating mechanism, is moulded or otherwise formed of suitable material so as to comprise the main body portion 1 and a removable cover portion 2. These assembled parts are shaped to make it easy to hold the device in the hand. The upper end of the housing, as shown in the drawings, is formed to provide a pair of transversely extending grooves or channels. One of these channels is of rectangular shape in cross section, and the other one has spaced parallel side walls adjacent the open side and a semicylindrical portion joining the side walls and forming the bottom of the channel. These channels are constructed to receive, properly position and support the shaver heads in spaced relation at the end of the housing.

Figure 3:
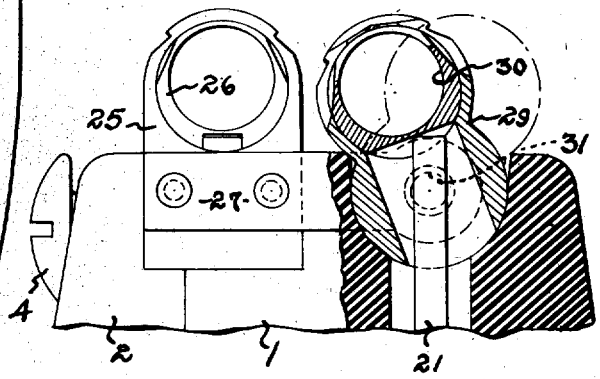
Fig. 3 is an enlarged view of the head end of this device showing the angularly adjustable head in cross-section.
Figure 4:
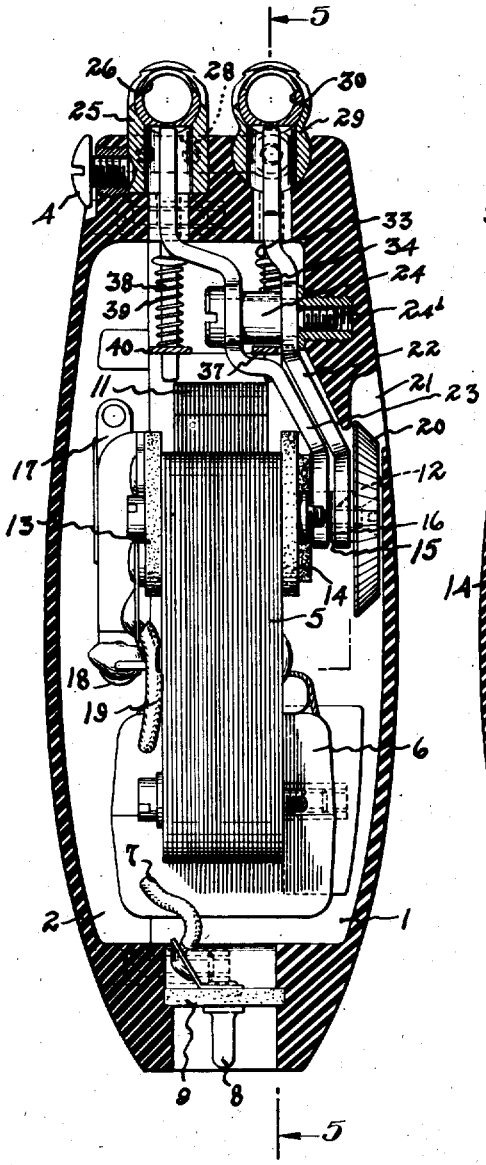
Fig. 4 is a vertical transverse cross-sectional view through the housing and the heads showing the motor mechanism in side elevation.
Figure 5:
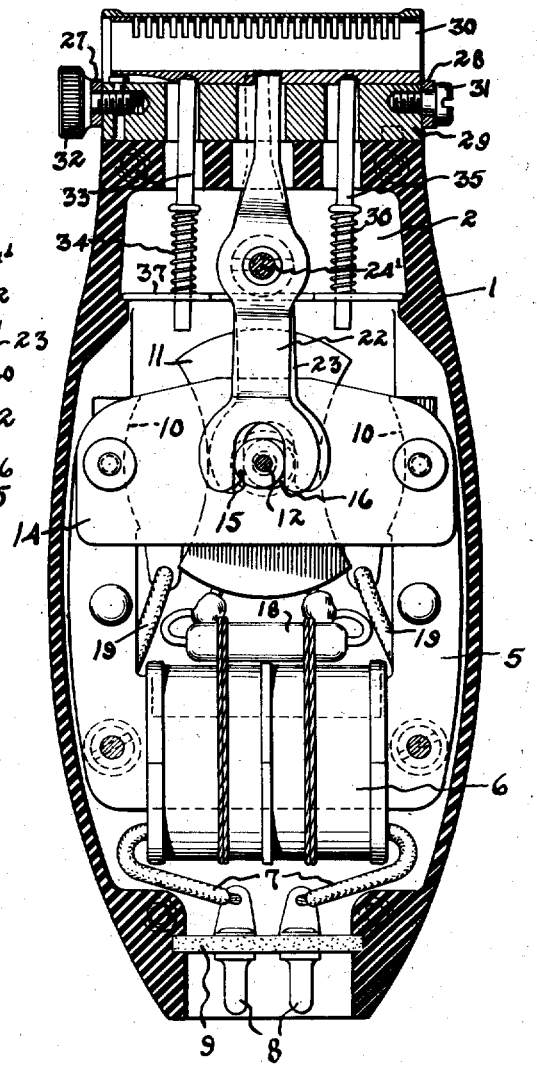
Fig. 5 is a cross-sectional view taken on the line 5—5 of Fig. 4.

The housing is also formed with openings (not numbered) extending from the bottom of each channel to the interior of the housing to provide space for operatively receiving operating levers 22 and 23, as shown in Figs. 3, 4 and 5.

The motor which is mounted within the housing is shown comprising a substantially U-shaped core 5, preferably built up of steel laminations and shaped to receive the magnetizing coil 6 formed around the base thereof. These laminations are secured together in any suitable manner, as by riveting, as indicated in Figs. 4 and 5, and the legs thereof are shaped to provide the poles 10. The current supply leads 7 for the coil 6 are connected to a pair of terminal prongs 8 mounted on a suitable insulating plate 9 mounted in the housing. Connection to these terminals may be made by means of any suitable connector plug forming part of the current supplying cable commonly employed with such devices.

Secured to the opposite sides of the core 5, so as to enclose the pole faces from the sides are a pair of insulating plates 13 and 14 which may be secured thereto by means of screws, as shown, or other suitable means. Journaled in these plates is a shaft 12 which extends transversely of the longitudinal axis of the core and has mounted thereon between the insulating plates a suitably shaped armature 11 comprising a plurality of steel laminations secured together. The ends of the armature are cylindrical in form and coaxially arranged with respect to the axis of rotation. The cylindrical ends terminate in close but spaced relation to pole faces 10 also of cylindrical form, as shown in Fig. 5. Secured to the shaft 12 and preferably angularly displaced 180 degrees from each other, are a pair of eccentrics 15 and 16 which lie respectively within the bifurcated ends of the levers 22 and 23. These levers are pivotally mounted on pivot pin 24′ secured in a socket member carried by the housing as shown in Fig. 4. A collar 24 on pin 24′ separates the levers.

At 17 is generally shown a suitable make and break mechanism comprising a pair of contacts which alternately engage and disengage by reason of a cam acting therebetween and mounted on the shaft 12. This cam is not shown. It is positioned with respect to the ends of the armature so as to make and break the circuit to the coil 6 in the proper timed relation in accordance with well known practice to effect continuous rotation of the armature. The mechanism of this type, as is well known, adapts the device to operation from either alternating or direct current circuits. The contacts are connected in series with the winding 6 by means of the leads 19 and are shunted by means of condenser 18 to reduce sparking, all in accordance with well known practice.

As is clear from Fig. 4 the portion 1 of the housing is provided with an opening 21 through which a knurled wheel 20 may be engaged by the thumb to effect rotation thereof. This wheel is secured to the shaft 12 and is employed, as is well known, for purposes of starting the motor in the event that it stops after previous use in a position so that the contact operating cam holds the contacts apart, thereby breaking the circuit which includes the coil 6.

Figure 2:
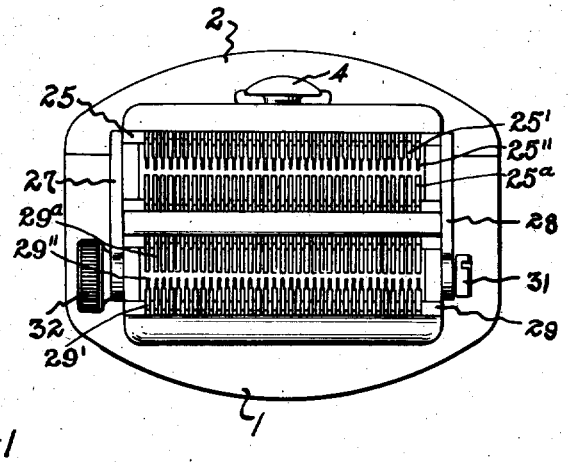
Fig. 2 is a top plan view thereof.

The fixed head is shown comprising an outer member 25 which has a rectangular base to fit in the rectangular groove in the housing. The rectangular base is formed, as shown in Figs. 4 and 5, with transversely extending openings registering with the openings in the housing and opening into the longitudinal bore formed in the substantially semi-cylindrical top portion of the head. This longitudinal bore is formed in the head in such manner that it provides a thin wall which is transversely slotted in accordance with common practice to form a plurality of cutter bars. As is clear from Fig. 2, two rows of cutter bars disposed on opposite sides of a longitudinal center line are provided. Mounted in the bore of the member 25 is the inner cutter 26 which is shown in the form of a cylinder, the inner bore of which is eccentric to form a thin wall at the top which is transversely slotted to form the inner cutter bars. The lower surface of the inner cutter is notched to receive the upper end of the operating lever 23 which is shaped so as to fit therein. The upper end of operating lever 23 extends through the aligned openings in the housing and base of the outer cutter member in being constructed and arranged for engaging in the notch of the inner cutter. Secured to the ends of the member 25, as is clear from Figs. 1 and 2, are a pair of bars 27 and 28 which may be riveted thereto, and which extend outwardly from one side so as to overlie the ends of the channel in the end of the housing formed with the semi-cylindrical bottom portion. At 29 is the outer member of the second head which is pivotally mounted at one end by means of the screw 31 on the lever 28 and at the other end by means of a thumb screw 32 on the bar 27. The outer member 29 is shaped in cross section, as is clearly shown in Fig. 3, so as to have a semi-cylindrical base formed to fit in the channel in said housing having the semi-cylindrical bottom portion. Its upper end is substantially semi-cylindrical in shape and has a longitudinal bore therethrough to form a thin wall at the top which is transversely slotted, see Fig. 2, to form one or more rows of cutter bars. In the arrangement shown it is preferable, in order to secure maximum efficiency and rapid shaving, to have two rows of cutter bars on each head as will be apparent later. Mounted in the bore of the member 29 is the inner cutter 30 quite similar to the cutter 26, and notched at the bottom to receive the upper end of the operating lever 22. Lever 22 extends through the aligned openings in the housing and base of the outer cutter to engage the notch at the bottom of the inner cutter in the manner clearly shown in Fig. 3. It is to be noted that when the thumb screw 32 is loosened, as will be clear from the figures, the head 29—30 may be rotated about the pivot screw 31 and the thumb screw 32 to any desired angle within the range shown in Fig. 3, and then locked in place by the thumb screw 32. It will be noted that the semi-cylindrical base of member 29 seats in the channel in the housing in such a manner that the above described rotation of the head is provided for by said semi-cylindrical construction of both member 29 and the channel in the housing.

As clearly shown in Fig. 2, each of the heads is provided in the outer members 25 and 29 respectively, with two rows of slots extending parallel to each other and disposed on opposite sides of a longitudinal axis. The outer row of slots of the outer member 25 is made up of two portions 25′ and 25″ while the outer row of slots of the outer member 29 is likewise made up of two portions 29′ and 29″. Each portion of the slots is of uniform width but the portions 25″ and 29″ are narrower than the portions 25′ and 29′. The other two rows of these members, which are the inner rows, comprise slots 25*a* and 29*a* which are of uniform width throughout their length and, as illustrated, are the same width as the wider portions of the other two rows of slots. Because of the relative position of the two heads, it is desirable to have the two inner rows 25*a* and 29*a* wider to permit the easy entry of hairs. It is obvious that the skin cannot easily get down between the two heads with the result that there is no danger of injury because of the use of the wider slots and advantage is thus taken of this fact to provide an arrangement which facilitates the entry and cutting off of long soft hairs.

As is clear from Figs 4 and 5 each inner cutter, that is the cutters 26 and 30, is pressed upwardly against the rear faces of the cutter bars and the outer members by means of spring pressed plungers. These plungers extend through registering openings in both the housing and base of the outer cutter member. Thus the inner cutter 30 is engaged by the plungers 33 and 35 which have shoulders formed thereon against which the ends of the springs 34 and 36 respectively rest. The lower ends of these springs rest on a bar 37 mounted in the housing through which the lower ends of the plungers pass. A similar set of spring pressed plungers act on the inner cutter 26. One of these is shown in Fig. 4 comprising the plunger 38, spring 39 and bar 40 corresponding to the bar 37.

Furthermore, as is clear from Fig. 4, it is noted that the fixed head is locked in its groove in the housing by means of the set screw 4 engaging the outer member 25. Since the other head is supported from the former by means of the bars 27 and 28 they may be removed as a unit and are located in place by means of the set screw 4 as a unit.

An important advantage of the construction of this type will be realized when consideration is had of the device in use. Let it be presumed that the two heads are being moved over the face so that the head 29 of Fig. 1 precedes the head 25 with respect to their direction of movement. The frictional engagement of the skin with the head 29 will tend to cause the skin to form a roll or bulge in front thereof. The two heads will tend to tauten the skin therebetween, causing a fold or bulge in the skin between the heads that causes hairs to project themselves away from the skin so that they can be picked up and cut off closely by trailing head 25. Thus the hairs which are not removed by the leading head are more certainly to be removed by the trailing head. A further advantage of an arrangement of this type is that by angularly tilting the head 29 with respect to the head 25 as indicated in Fig. 3 the separation of the active areas of the two heads may be varied and the manner of engagement of the two heads with respect to the surface of the skin being operated on will insure a more accurate and close engagement of the heads with the face or surface, especially at the points where the contour is rapidly changing, as for example around the chin and jawbone.

With an arrangement of this type it is possible to insure that condition essential to effective shaving in devices of this type, namely that the active areas of the cutter bars snugly hug the immediate surfaces being operated upon. In the case of shaving heads which have flat surfaces on their outer contacting areas as indicated in Figs. 3 and 4 for example, the tilting of one of the heads insures proper positioning of these flat areas against the skin. The angular adjustability feature while not limited to heads having outer cutter bars with flat outer faces, is very effective therewith.

A further important feature of this invention is represented by the fact that the eccentrics 15 and 16 are displaced 180 degrees from each other so that the operating levers and inner cutters, as well as the cams are operating in balanced or opposed relation, thereby reducing to a minimum the vibration of the mechanism when in operation.

Figure 6:
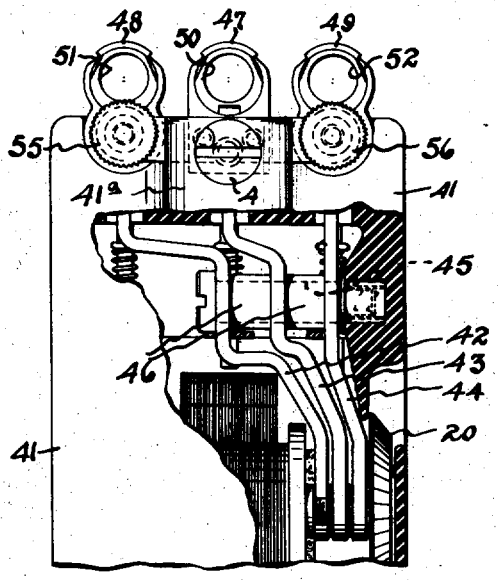
Fig. 6 is a side elevational view of a portion of a modified arrangement showing parts of the casing broken away in which three independent shaving heads are employed two of which are angularly adjustable with respect to each other and the third head.
Figure 7:
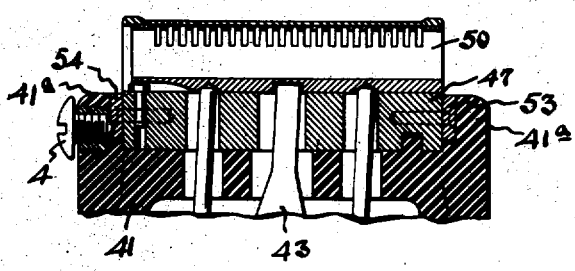
Fig. 7 is a longitudinal, vertical, cross-sectional view through the central head and a portion of the housing.

In the arrangement of Fig. 6 the motor shaft is provided with three cams which are preferably displaced 120 degrees in angular relation with respect to each other. These cams are respectively engaged by three levers 42, 43 and 44, which are pivotally mounted on a stud shaft 45 projecting from the inner face of one of the walls of the casing and held in proper spaced relation by the collars 46. These levers are formed so that they may extend upwardly into engagement with the inner cutters 51, 50 and 52 of the three heads of this device in the manner illustrated in Fig. 4.

These cutters are respectively mounted within the outer members 48, 47 and 49 and the inner cutters and outer members are formed as previously described to provide cooperating cutter bars. The outer members 48 and 49 are supported from the outer members 47 by means of a pair of bars 53 and 54 as will be apparent from the figures, which bars are secured to the outer member 47 in any suitable manner. In this case the housing is formed with a central rectangular channel across the end thereof to receive the center head, and a pair of channels at opposite sides thereof of substantially duplicate form having spaced parallel side walls at the open side and a semi-cylindrical bottom portion joining said side walls. This pair of channels each receive one of the two outside heads having semi-cylindrical bases thereon closely fitting and seating in said channels. The casing is moulded so as to have integral abutments 41*a* at the ends of the rectangular channel to aid in positioning the heads and to provide a seat for the set screw 4 by means of which the head unit is held in place. The two outer heads are pivotally mounted at their right hand ends, Figure 8, on screws, not shown, mounted in the bar 53 similar to the screw 31 of Fig. 5. At the other ends the knurled thumb screws 55 and 56 are provided to pivotally mount them in the bar 54 and to lock them in adjusted position.

Figure 8:
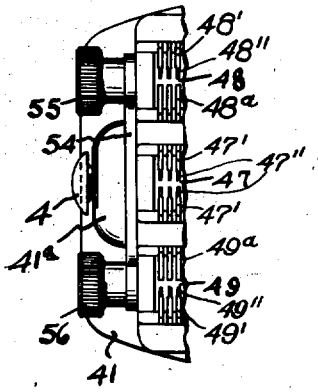
Fig. 8 is a top plan view with most parts broken away of the arrangement of Fig. 6.

The triple head arrangement of Fig. 8 employs the slot feature previously described in connection with Fig. 1. Thus the outer member 48 of one head is provided with an outer row of slots having the portions 48' and the relatively narrower portions 48''. The inner row of this head comprises slots 48 of uniform width. The two rows of slots on the outer member of the head 48 each comprise portions 47' and relatively narrower portions 47''. The outer member of the head 49 has the outer row of slots comprising portions 49' and the relatively narrower portions 49''. The inner row of slots of this head, as indicated at 49*a*, are of uniform width.

The advantages and method of operation previously described in connection with the arrangement of the previous figures apply to this arrangement. In this case, however, both of the outer heads are angularly adjustable with respect to the central head and if desired in opposite directions with respect to each other to even more accurately position the active cutting areas of the three heads to insure a close rapid shave.

Figure 9:
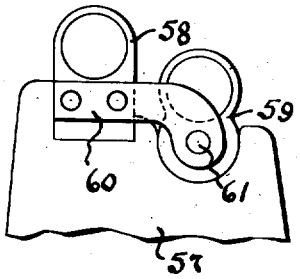
Fig. 9 is a side elevational view somewhat in diagrammatic form of a modified arrangement in which two heads mounted in different planes are employed, one of which is angularly adjustable with respect to the other.
Figure 10:
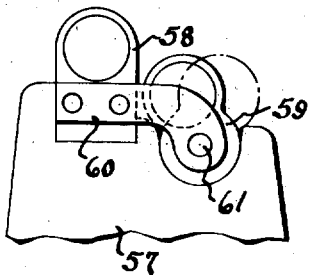
Fig. 10 is a view similar to Fig. 9, indicating the angular adjustment of the movable head.

In the arrangement of the remaining figures the heads are arranged on a plane that is inclined to the longitudinal axis of the casing. In the structure of Figs. 9 and 10 the upper end of the casing is shown at 57. It is provided with a rectangular and a semi-cylindrical groove across the end thereof which are arranged in vertical spaced relation, as is clear from Fig. 9. In the rectangular groove is the head 58 and in the semi-cylindrical groove is the head 59. In this case the head 59 is pivotally supported from the head 58 from a pair of brackets only one of which is shown at 60 secured to the head 58 and of the proper shape to permit of pivotal support of the head 59 on the pivot pins, only one of which is shown at 61. As before, one of these pivot pins may be in the form of a knurled screw having an enlarged head to permit of loosening and tightening for adjusting purposes. The range of angular movement of the head 59 is indicated in Fig. 10. In addition to the advantages described in connection with the previous arrangements this structure in adjusting the heads on an inclined plane makes it possible for the operator to hold the device in his hand at a natural angle with respect to the plane of the face when both of the cutters are in contact therewith.

Figure 11:
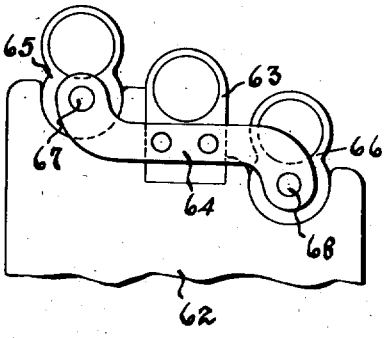
Figs. 11 and 12 are views similar to Figs. 9 and 10 of a device employing three separate heads, two of which are angularly adjustable.
Figure 12:
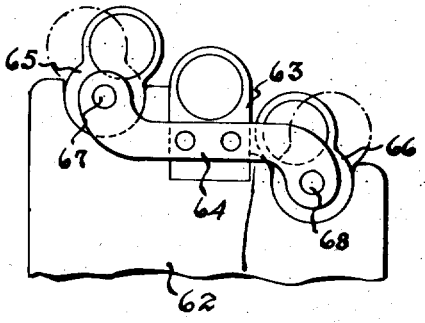

The feature of the arrangement of Figs. 11 and 12 is shown employed in connection with a shaving device having three separate shaving heads mounted thereon in a plane inclined to the longitudinal axis of the housing. In this case the upper end of the housing 62 is shown having a central rectangular groove and a pair of semi-cylindrical grooves on the end thereof disposed on opposite sides of the central groove. In the central groove is mounted the head 63 and secured to the ends thereof are bars, only one of which is shown at 64. These bars are of course similarly shaped and serve to pivotally support at the ends thereof the angularly adjustable outside heads 65 and 66. The head 65 is pivotally mounted on the bars by means of pivot pins, one of which is shown at 67, and similarly there is shown at 68 one of the pivot pins for the head 66. Fig. 12 illustrates the range of angular adjustment of the two outside heads. In this arrangement, of course, the thumb screws can be provided to permit of loosening and tightening the heads to aid in adjusting them.

In the arrangements of Figs. 9 to 12, as in the case of the previous arrangements, the head unit may be locked in place by any suitable means, such as a set screw.

In the device of Figs. 11 and 12 by reason of the vertically displaced relationship between the various heads and the angular adjustability of the outer heads, it is possible to secure a maximum of coincidence with the contour of the face, and to obtain a very rapid close shave. It will, of course, be apparent that in any of these arrangements, and particularly those in Figs. 9 to 12 inclusive, that when desired the uppermost head alone may be used for shaving. In all of these arrangements the leading head with respect to the direction of movement of the device over the face will serve to tauten the skin to facilitate operation thereon of the remaining heads.

From the above description it will be apparent to those skilled in the art that the invention herein disclosed may be embodied in a number of different physical forms without departure from the true scope thereof. I wish it to be distinctly understood, therefore, that I am not to be limited to the specific forms of the device illustrated in the drawings and referred to in the description but rather by the scope of the appended claims.

The invention claimed is:

1. In a shaving device as described the combination comprising a handle forming a housing, an operating motor in the housing, a pair of shaving heads mounted on the housing at the same end, each comprising an outer slotted member and an inner slotted cutter bar, and a pair of levers pivotally mounted on the same axis for connecting said inner cutter bars to said motor to effect simultaneous movement thereof in opposite directions.

2. A shaving device of the type described comprising a housing forming a handle, a motor mounted in said housing, a plurality of cutter heads mounted on said housing, at least one of which is angularly adjustable with respect to the others, and means for operatively connecting said heads to said motor.

3. A shaving device of the type described comprising a housing forming a handle, a motor mounted in said housing, three cutter heads mounted on said housing, two of which are angularly adjustable with respect to the other, and means for operatively connecting the cutter heads with the motor.

4. A shaving device of the type described comprising a housing forming a handle, a motor mounted in said housing, three cutter heads mounted on said housing, two of which are angularly adjustable with respect to the other, and each other, and means for operatively connecting the cutter heads with the motor.

5. A shaving device of the type described comprising a housing forming a handle, a motor mounted in said housing, a pair of cutter heads mounted on said housing, one of which is angularly adjustable with respect to the other, and means for operatively connecting the cutter heads to said motor.

6. A shaving device of the type described comprising a housing forming a handle, a motor mounted in said housing, a plurality of cutter heads mounted on the end of said housing in vertically displaced relation, at least one of which is angularly adjustable with respect to the others, and means for operatively connecting the cutter heads to said motor.

7. A shaving device of the type described comprising a housing forming a handle, a motor mounted in said housing, three cutter heads mounted on the end of said housing in vertically displaced relation, two of which are angularly adjustable with respect to the third, and means for operatively connecting the cutter heads to the motor.

8. A shaving device of the type described comprising a housing forming a handle, a motor mounted in said housing, three cutter heads mounted on the end of said housing in vertically displaced relation, two of which are angularly adjustable with respect to the third and each other, and means for operatively connecting the cutter heads to the motor.

9. A shaving device of the type described comprising a housing forming a handle, a motor mounted in said housing, a pair of cutter heads mounted on said housing in vertically displaced relation, one of said heads being angularly adjustable with respect to the other, and means for operatively connecting said heads to said motor.

10. In a dry shaving implement of the type described the combination including a housing, an operating motor mounted in said housing, a shaver head including outer and inner slotted members mounted on said housing, a second shaver head comprising outer and inner slotted members pivotally supported from said first shaver head, means for pivoting said second head with respect to said first head, and means for operatively connecting the inner members of both heads to said motor.

11. A shaving implement as described comprising a housing, a motor mounted in said housing, a shaver head mounted on said housing, two additional shaver heads pivotally supported from said first shaver head, means for causing pivotal movement of said additional shaver heads, and means for operatively connecting the shaver heads to said motor.

12. A shaving implement as described comprising a housing, a motor mounted in said housing, a shaver head mounted on said housing, two additional shaver heads pivotally supported from said first shaver head in vertically displaced relation, means for causing pivotal movement of said additional shaver heads, and means for operatively connecting the shaver heads to said motor.

13. A multiple head dry shaver comprising a housing having a plurality of spaced transverse channels formed in one end thereof and opening in the same direction, a plurality of shaver heads each comprising an outer stationary cutter and an independent separate inner cutter reciprocally enclosed within said outer cutter, each of said outer cutters being formed to provide a base portion, each shaver head having the base portion on the outer cutter thereof seated in one of said channels, all of said shaver heads projecting beyond the same end of said housing in the same direction for simultaneous joint shaving operation, means for retaining said heads in said channels, a motor mounted in said housing, and lever means mounted on said housing and driven by said motor having a plurality of spaced arms extending in the same direction, each arm independently engaging the inner cutter in one of said shaver heads for simultaneously operating all of said inner cutters during operation of said motor.

14. A multiple head dry shaver, comprising a housing formed at one end with channel means extending transversely thereof on the same end and with a separate motor compartment, said housing being also formed to provide aperture communication between said channel means and motor compartment, a plurality of shaver heads, each of said shaver heads having an outer stationary cutter member and an independent inner cutter reciprocably enclosed in an independent longitudinal channel formed in the outer portion of the outer cutter member, each outer cutter member having the inner portion forming a base member, each base member being formed with an opening communicating with the inner cutter at one end and registering with the aperture communication in said housing at the opposite end, said base portions all being received and seated in said channel means in mounting said heads on said housing, said housing and base portions being formed for intimate cooperative engagement in assembled relation for spacing the outer portions of said heads relative to one another, means detachably retaining said heads in said channel means, a motor mounted in said motor compartment, and lever means pivoted in said housing having connection for reciprocation by said motor and having a plurality of spaced arms extending in the same direction through said aperture communication with each arm extending through the opening in one of the base members to independently engage one of the inner cutters for reciprocating all of said inner cutters simultaneously in the operation of said motor.

15. A multiple head dry shaver, comprising a housing formed with a motor compartment, a plurality of separate shaver heads each having an outer stationary cutter member formed with an outer portion having a longitudinal channel and an inner portion forming a base member, each base member having an opening communicating with said channel and each head having an independent separate inner cutter reciprocably housed in said channel in said outer cutter, said housing and heads being formed for cooperative engagement to mount each of said heads on the same end of said housing with the outer portions projecting in the same direction in spaced substantially parallel relation for simultaneous joint shaving operation, means detachably retaining said heads engaged with said housing, a motor in said motor compartment in said housing having a rotor arranged with its axis of rotation parallel to the plane of reciprocation of said inner cutters, and means for transmitting motion from said motor through said housing and openings in said base members for independently engaging and reciprocating said inner cutters simultaneously in the operation of said motor.

16. A multiple head dry shaver, comprising a housing, a plurality of shaver heads each comprising an outer stationary cutter and an independent separate inner cutter reciprocably enclosed within said outer cutter, each of said outer cutters being formed to provide a base portion, one end of said housing and all of said base portions being cooperatively formed for engagement for mounting all of said heads on the same end of said housing and projecting therefrom in the same direction for simultaneous joint shaving operation, a motor mounted in said housing, lever means mounted on said housing and driven by said motor having a plurality of spaced arms extending in the same direction, each arm independently engaging the inner cutter in one of said shaver heads for simultaneously operating all of said inner cutters during operation of said motor, and a plurality of independent separated sets of resilient means each engaging one of said inner cutters for independently and resiliently holding it in shaving cooperation in its outer cutter.

17. A multiple head dry shaver, comprising a housing formed at one end with a pair of spaced parallel channels extending transversely thereof, said housing having openings formed therein extending from each channel, respectively, to the interior of said housing, a motor mounted in said housing, a pair of shaver heads of substantially duplicate form, each having an outer cutter and a reciprocable inner cutter, each outer cutter having a shaving section and a base portion, each base portion having an opening therein registering with the opening in said housing and communicating with said inner cutter, means for detachably retaining said heads in said channels, and lever means pivoted in said housing having connection for reciprocation by said motor and having independent arms extending one through each of said registering openings to engage and reciprocate said inner cutters simultaneously.

JAMES H. RAND, JR.